US006859338B2

(12) United States Patent
Johnson

(10) Patent No.: US 6,859,338 B2
(45) Date of Patent: Feb. 22, 2005

(54) SYSTEM AND METHOD FOR SCANNING A MEDIUM

(75) Inventor: Bruce L. Johnson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 10/078,891

(22) Filed: Feb. 19, 2002

(65) Prior Publication Data

US 2003/0156300 A1 Aug. 21, 2003

(51) Int. Cl.$^7$ ............................ G02B 26/08; H04N 1/40
(52) U.S. Cl. ........................ 359/822; 359/198; 359/809; 358/471
(58) Field of Search .................................. 359/196–198, 359/200–215, 822, 809; 358/471

(56) References Cited

U.S. PATENT DOCUMENTS

| | | | |
|---|---|---|---|
| 5,805,311 A | | 9/1998 | Phillips ....................... 358/500 |
| 5,907,413 A | * | 5/1999 | Han ............................ 358/497 |
| 5,946,010 A | * | 8/1999 | Isobe et al. .................. 347/37 |
| 6,232,953 B1 | | 5/2001 | Graham et al. ............. 345/596 |

* cited by examiner

*Primary Examiner*—Hung Xuan Dang
*Assistant Examiner*—Joseph Martinez

(57) ABSTRACT

A system for scanning a medium having an axis includes a housing and an optical imaging head assembly mounted in the housing and having an assembly axis. The assembly axis of the optical imaging head assembly is oriented at an acute angle with respect to the axis of the medium.

33 Claims, 8 Drawing Sheets

SYSTEM AND METHOD FOR SCANNING A MEDIUM

THE FIELD OF THE INVENTION

The present invention relates generally to photoelectric imaging devices, and more particularly to a photoelectric imaging device that employs an angled optical imaging head assembly to improve a quality of a scanned halftone image by preventing artifacts from appearing in the scanned halftone image.

BACKGROUND OF THE INVENTION

Photoelectric imaging devices include line-focus systems that scan an image provided on a medium by sequentially focusing narrow scan-line portions of the image onto a sensor array by moving an optical imaging head assembly relative to the medium. Such line-focus systems are commonly referred to as optical scanners. As illustrated in FIG. 1, a portion of a conventional optical scanner 10 for scanning a medium 11 that has a longitudinal medium axis and a transverse medium axis includes a housing 12, an optical imaging head assembly 14, and a platen 16. The housing includes a longitudinal axis 18 and a transverse axis 20. The longitudinal axis of the housing is substantially parallel to the longitudinal medium axis, and the transverse axis of the housing is substantially parallel to the transverse medium axis. These relationships are maintained as the medium is scanned. The optical imaging head assembly includes an assembly axis 22. In the conventional optical scanner, the transverse axis is substantially perpendicular to the longitudinal axis of the housing and the optical imaging head assembly is oriented such that the assembly axis is also substantially perpendicular to the longitudinal axis of the housing. The optical imaging head assembly is mounted in the housing for movement along the longitudinal axis of the housing in the directions indicated by double arrow 24. The platen is mounted on the housing over the optical imaging head assembly such that the optical imaging head assembly moves underneath the platen along the longitudinal axis of the housing to scan an image of the medium placed face down on the platen. Thus, when the optical imaging head assembly moves along the longitudinal axis of the housing, the assembly axis of the optical imaging head assembly remains parallel to the transverse axis of the housing and the transverse medium axis.

In the conventional optical scanner, the optical imaging head assembly, commonly referred to as a scanner bar or a scanning head, typically includes a light source and a sensor array, such as a charged coupled device (CCD) or a contact image sensor (CIS), which includes light receptors that detect variations in light intensity and frequency by building up an electrical charge in response to exposure to light for a preset period of time. As such, the light source illuminates the surface of the medium and the sensor array converts reflected or transmitted light from the surface into electrical signals. Each element or cell of the sensor array corresponds to a small area, commonly referred to as a picture element or pixel, and produces a data signal that is representative of the intensity of light from the area. As such, each cell has a portion of a scan-line image impinged thereon as the optical imaging head sweeps across the image. The electrical signals can then be stored in a file, manipulated by programs, and/or used for reproduction of the image.

Halftoning is a technique used to create images with varying shades or levels of gray or other colors. More specifically, with halftoning, patterns of closely spaced individual dots of black or an appropriate color, such as cyan, yellow, or magenta, are formed to create an image. Thus, by using halftoning, the illusion of more grays or colors other than those within a color gamut of a device, such a display or printer, is created. The varying shades or levels of gray or other colors are achieved by varying the size and/or spacing of the individual dots. The dots of each respective color in a color halftone image are arranged in rows of dots such that the rows of dots of each respective color are typically inclined at different angles with respect to the vertical. Thus, spacing of the rows establishes a halftone resolution of the image and an angle of each of the rows establishes a halftone angle of the image.

Unfortunately, scanning a halftone image with the conventional optical scanner may create image artifacts or defects that degrade image quality and detract from the appearance and usability of the scanned image. For example, at certain scanning resolutions, the image pixels and halftone dots may interfere, thereby creating moiré patterns represented by bands or blotches across the scanned image. This happens when a physical resolution or frequency of the optical imaging head assembly of the conventional optical scanner is too close to the halftone resolution of the halftone image. As a result, the conventional optical scanner thereby picks up alternating light and dark parts of the halftone image resulting in bands and blotches across the scanned halftone image. Attempts to remove such artifacts have included high resolution scanning and the use of computationally intensive algorithms, which tend to be relatively slow or require a powerful computer. Also, simple averaging algorithms that are used to filter the image data tend to be inaccurate, which may create other kinds of image distortions.

Accordingly, a need exists for preventing artifacts from appearing in scanned half tone images without having to rely on high resolution scanning or computationally intensive algorithms to remove artifacts from already scanned halftone images.

SUMMARY OF THE INVENTION

One aspect of the present invention provides a system for scanning a medium having an axis. The system includes a housing and an optical imaging head assembly mounted in the housing and having an assembly axis. As such, the assembly axis of the optical imaging head assembly is oriented at an acute angle with respect to the axis of the medium.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. In this regard, directional terminology, such as "top," "bottom," "left," "right," "leading," "trailing," etc., is used with reference to the orientation of the Figure(s) being described. The optical scanner and related components of the present invention can be positioned in a number of different orientations. As such, the directional terminology is used for purposes of illustration and is in no way limiting. It is also to be understood that other embodiments may be utilized and structural or logical changes may be made without departing from the scope of the present invention. The following detailed description, therefore, is not to be taken in a limiting sense, and the scope of the present invention is defined by the appended claims.

Figure 2:
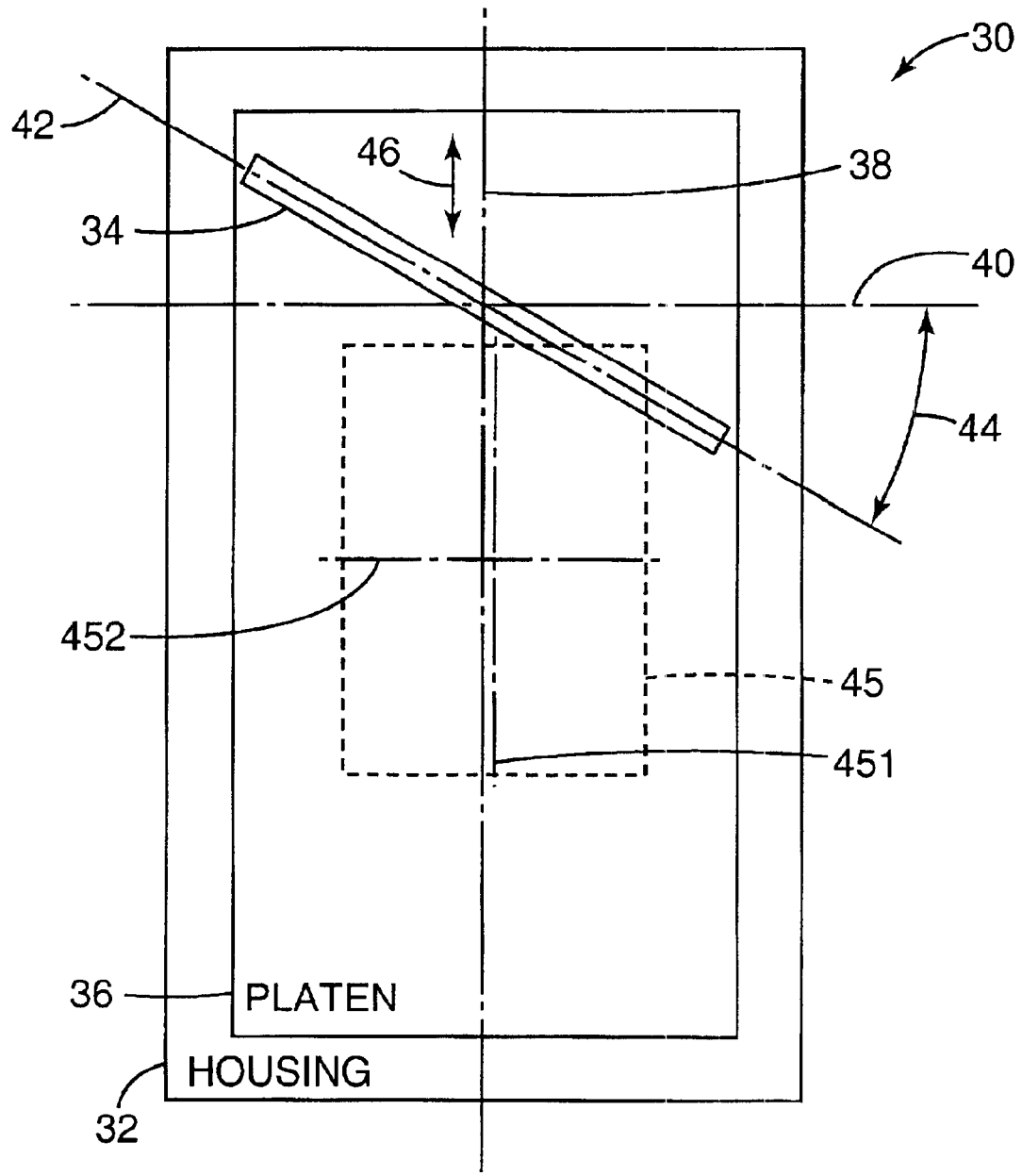
FIG. 2 is a schematic illustration of one embodiment of a portion of an optical scanner according to the present invention.

FIG. 2 illustrates one embodiment of a portion of an optical scanner 30 according to the present invention. Optical scanner 30 may be or may be included in a wide variety of devices such as a printer, multifunctional peripheral device (MFP), fax machine, copier, hardcopy imaging device, and/or communication and telephony device. Optical scanner 30 includes a housing 32, an optical imaging head assembly 34, and a platen 36. Housing 32 includes a first housing axis 38 and a second housing axis 40 oriented substantially perpendicular to first housing axis 38. In one embodiment, first housing axis 38 constitutes a central longitudinal axis of housing 32. In one embodiment, second housing axis 40 constitutes a transverse axis.

Optical imaging head assembly 34 has an assembly axis 42. Optical imaging head assembly 34 is mounted in housing 32 such that assembly axis 42 is oriented at an angle 44 with respect to second housing axis 40. Preferably, angle 44 is an acute angle. In one illustrative embodiment, angle 44 is in a range of approximately 20 degrees to approximately 40 degrees. In another illustrative embodiment, angle 44 is approximately 30 degrees. One embodiment of establishing angle 44, including providing misalignment of optical imaging head assembly 34 with respect to a halftone angle of a halftone image according to the present invention, is described in detail below.

Platen 36 is mounted on top of housing 32 over optical imaging head assembly 34. A medium 45 is supported on platen 36 for scanning. Preferably, medium 45 is aligned with housing 32 such that an axis of medium 45 is oriented substantially parallel with first housing axis 38. In one embodiment, medium 45 includes a halftone image (not shown). Medium 45 is positioned face down on platen 36 such that the halftone image is directed toward platen 36. In one embodiment, medium 45 includes a longitudinal medium axis 451 and a transverse medium axis 452, which is substantially perpendicular to longitudinal medium axis 451. When medium 45 is positioned on platen 36, longitudinal medium axis 451 is substantially parallel to first housing axis 38 and transverse medium axis 452 is substantially parallel to second housing axis 40. The halftone image is defined to include any pictorial, graphical, and/or textural characters, symbols, illustrations, and/or other representation of information. The halftone image is produced using a halftoning process as described below.

In one embodiment, as illustrated in FIG. 2, optical imaging head assembly 34 moves relative to medium 45 to scan medium 45, and, therefore, the halftone image. Optical imaging head assembly 34 moves underneath platen 36 along first housing axis 38 and longitudinal medium axis 451, as indicated by double arrow 46, to scan medium 45 positioned face down on platen 36 in alignment with housing 32. As optical imaging head assembly 34 scans medium 45, optical imaging head assembly maintains angle 44.

Figure 3:
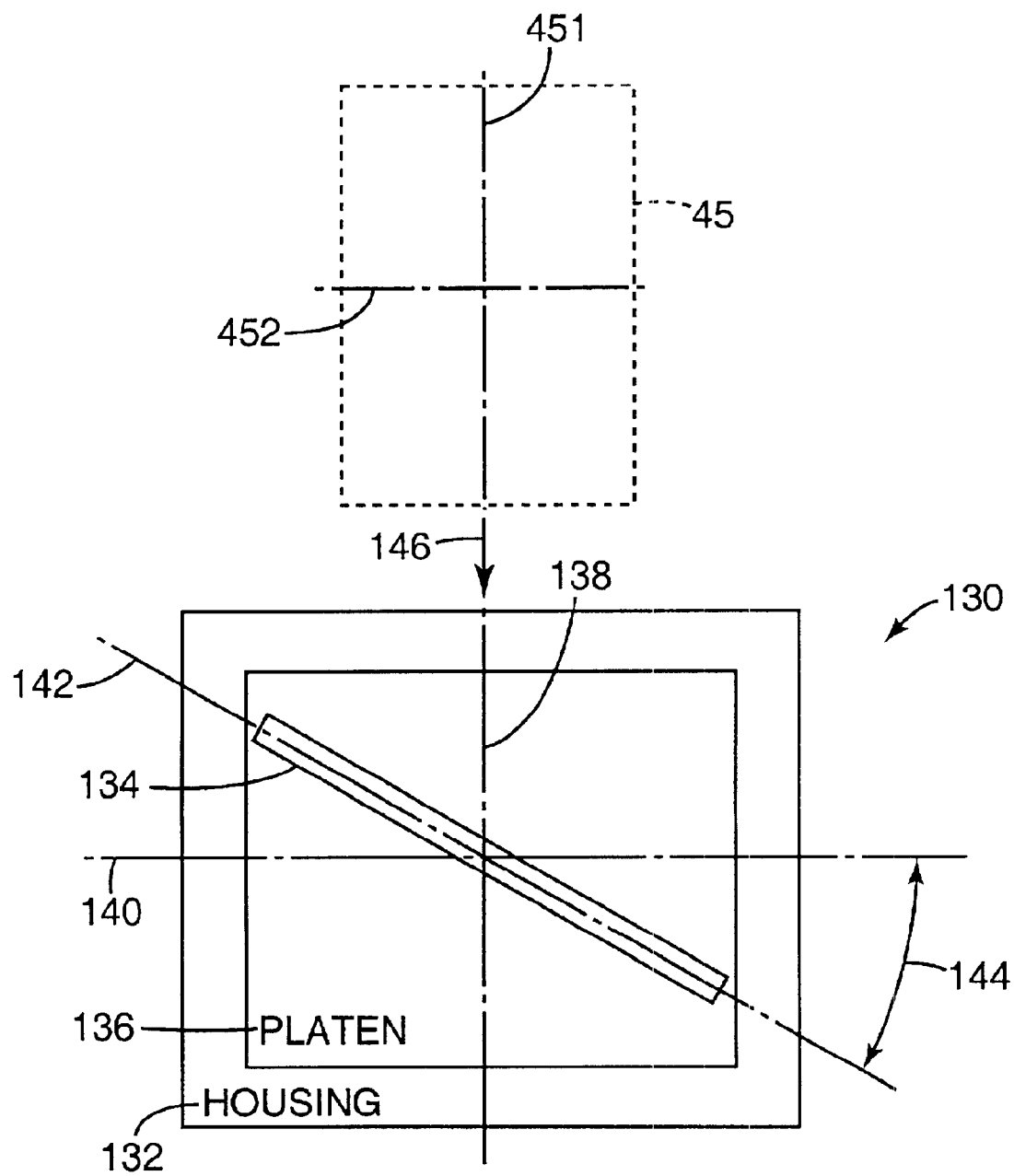
FIG. 3 is a schematic illustration of another embodiment of a portion of an optical scanner according to the present invention.

FIG. 3 illustrates another embodiment of a portion of an optical scanner 130 according to the present invention. Optical scanner 130, similar to optical scanner 30, includes a housing 132, an optical imaging head assembly 134, and a platen 136. Housing 132, similar to housing 32, includes a first housing axis 138 and a second housing axis 140 oriented substantially perpendicular to first housing axis 138. Optical imaging head assembly 134, similar to optical imaging head assembly 34, includes an assembly axis 142 and is mounted in housing 132 so as to be oriented at an angle 144 relative to second housing axis 140. Optical imaging head assembly 134, however, remains stationary during scanning of medium 45. More specifically, during scanning, medium 45, which includes longitudinal medium axis 451 and transverse medium axis 452, is moved in a direction indicated by arrow 146 passed optical imaging head assembly 134. As such, optical imaging head assembly 134 remains stationary at angle 144 while a medium transport assembly 59 (FIG. 6), such as an automatic document feeder, as is known in the art, moves medium 45 past optical imaging head assembly 134. Such an arrangement provides misalignment of optical imaging head assembly 134 with medium 45 similar to that illustrated and described above with reference to FIG. 2.

Figure 4:
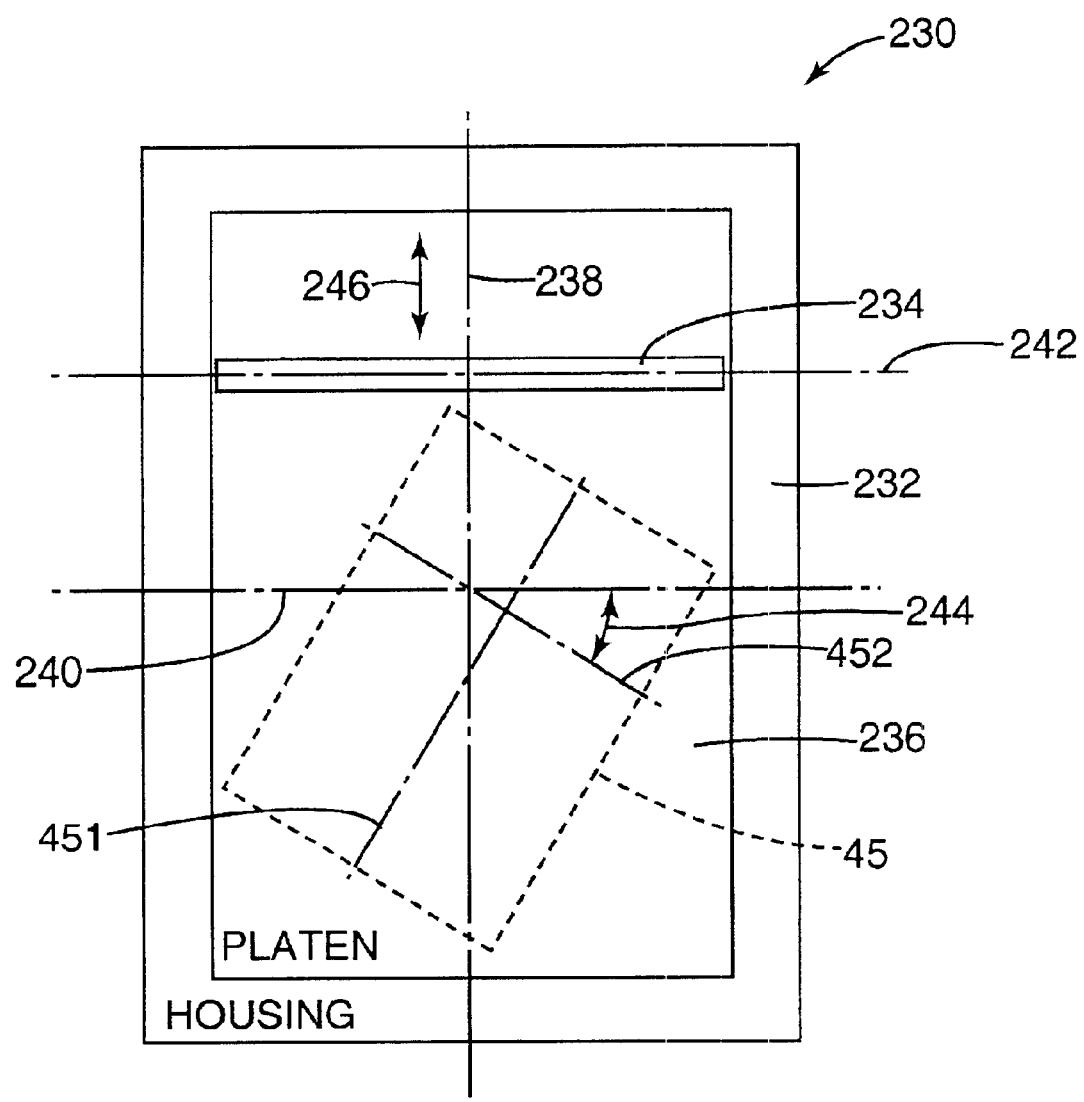
FIG. 4 is a schematic illustration of another embodiment of a portion of an optical scanner according to the present invention.

FIG. 4 illustrates another embodiment of a portion of an optical scanner 230 according to the present invention. Optical scanner 230, similar to optical scanner 30 and optical scanner 130, includes a housing 232, an optical imaging head assembly 234 and a platen 236. Housing 232, similar to housing 32 and housing 132, includes a first housing axis 238 and a second housing axis 240 oriented substantially perpendicular to first housing axis 238. Optical imaging head assembly 234, includes an assembly axis 242 and is mounted in housing 232 so as to be oriented substantially perpendicular to first housing axis 238. Optical imaging head assembly 234 is mounted in housing 232 for movement along first housing axis 238 in the directions indicated by double arrow 246 to scan medium 45, which includes longitudinal medium axis 451 and transverse medium axis 452. Platen 236 is mounted on housing 232 over optical imaging head assembly 234 such that optical imaging head assembly 234 moves underneath platen 236 along first housing axis 238 to scan medium 45 placed face down on platen 236 such that transverse medium axis 452 is oriented at an angle 244 with respect to second housing axis 240. Thus, when optical imaging head assembly 234 moves along first housing axis 238, assembly axis 242 of optical imaging head assembly 234 remains parallel to second housing axis 240 as optical imaging head assembly 234 scans medium 45.

Preferably, angle 244 (similar to angle 44) is an acute angle. In one illustrative embodiment, angle 244 is approximately 20 degrees to approximately 40 degrees. In another illustrative embodiment, angle 244 is approximately 30 degrees. One embodiment of establishing angle 244 includes providing misalignment of optical imaging head assembly 234 with the halftone angle of the halftone image according to the present invention is described in detail below.

Figure 5:
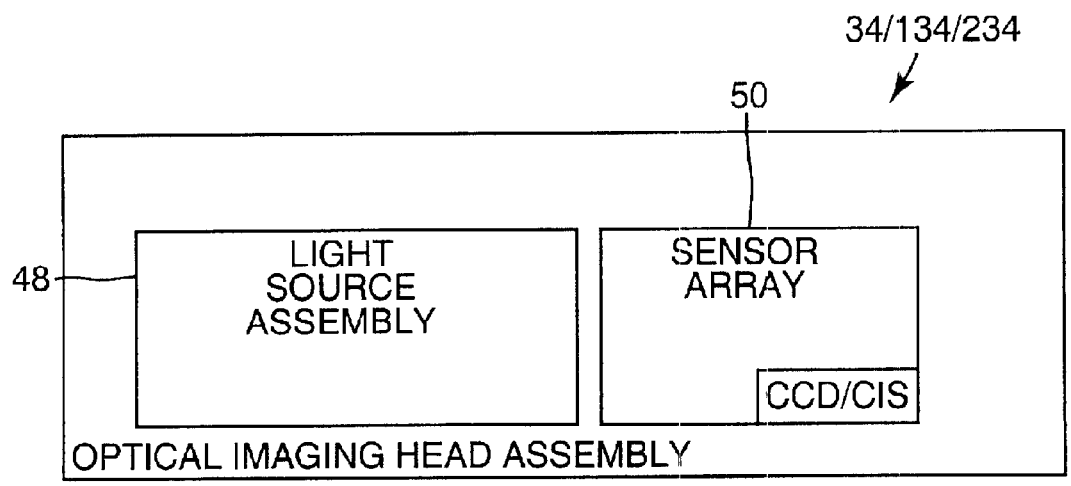
FIG. 5 is a schematic illustration of one embodiment of a portion of an optical imaging head assembly of the optical scanner of FIGS. 2 and 3.

FIG. 5 is a schematic illustration of one embodiment of optical imaging head assembly 34 (including optical imaging head assembly 134 and optical imaging head assembly 234). Optical imaging head assembly 34 includes a light source assembly 48 and a sensor array 50. As such, assembly axis 42 (including assembly axis 242 and assembly axis 244) is defined to include an axis extending along sensor array 50. Light source assembly 48 includes a light source and a lens assembly, as are known in the art. When medium 45 is positioned over optical imaging head assembly 34 for scanning of medium 45, light source assembly 48 focuses imaging light from a narrow scan line portion of the halftone image onto sensor array 50 to create an image of that portion of the halftone image that is illuminated by the light source. The entire halftone image is scanned by displacing optical imaging head assembly 34 with respect to medium 45 so that the entire sensor array 50 is successively exposed to adjacent scan line portions on medium 45, which are then successively focused on sensor array 50 to create a complete reproduction of the halftone image provided on medium 45.

In one embodiment, sensor array 50 generates a data signal representative of the intensity of the imaging light that is impinged thereon. Optical imaging head assembly 34 operates in successive sampling intervals to generate image data representative of the narrow scan line portion of the halftone image. As used herein, "scan lines" or "scan line" refers to an image of medium 45 that is projected or impinged on sensor array 50.

In one embodiment, to produce a sweeping scan line image of medium 45 at sensor array 50, optical imaging head assembly 34 is displaced at angle 44 relative to platen 36 and medium 45. Thus, in this embodiment, optical imaging head assembly 34 moves scan line from one end of medium 45 to the other. Optical imaging head assembly 34 progresses in a primary scan direction as previously illustrated by double arrow 46 in FIG. 2.

In one embodiment, sensor array 50 includes a charge coupled device (CCD) or contact image sensor (CIS). The CCD or CIS, as is known in the art, builds up an electrical charge in response to exposure to light from light source assembly 48 for a preset period of time known as a sampling interval. The CCD or CIS is composed of cells that are aligned in linear arrays. Each cell or pixel of the CCD or CIS has a portion of a scan line image impinged thereon as optical imaging head assembly 34 sweeps across medium 45. The electrical charge built up in each of the cells is measured and then discharged at the end of each sampling interval. In one embodiment, the sampling interval of the CCD or CIS array is fixed.

Figure 6:
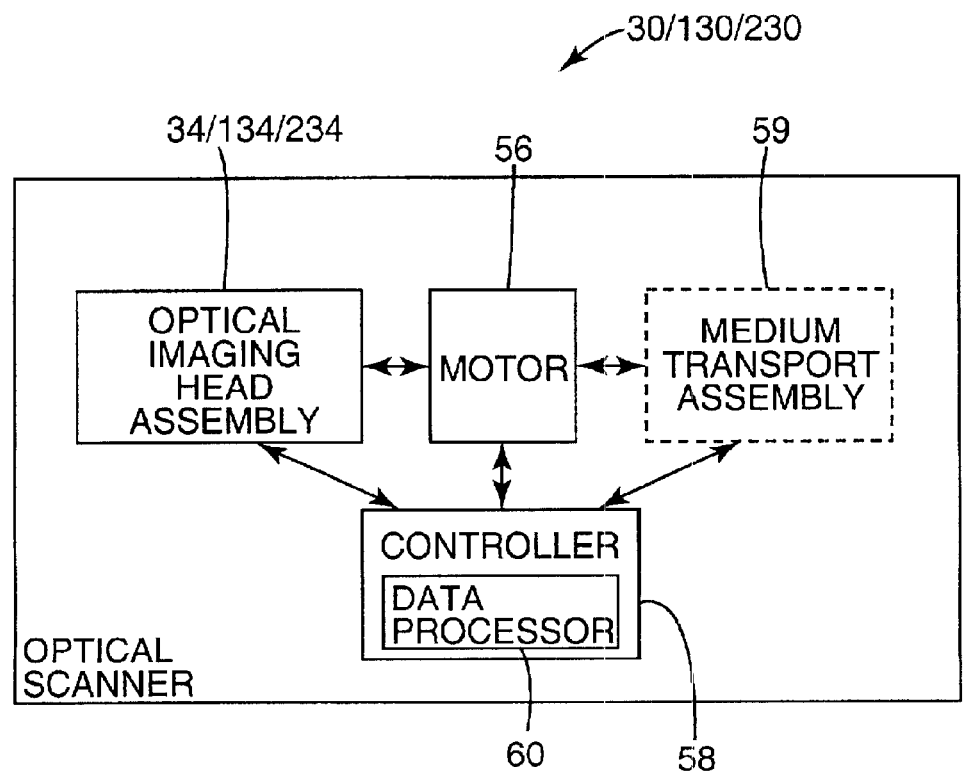
FIG. 6 is a schematic illustration of the optical scanner according to the present invention.

FIG. 6 illustrates one embodiment of optical scanner 30 (including optical scanner 130 and optical scanner 230). Optical scanner 30 includes optical imaging head assembly 34 (including optical imaging head assembly 134 and optical imaging head assembly 234), a motor 56, and a controller 58. Motor 56 is associated with optical imaging head assembly 34 to advance or move optical imaging head assembly 34 relative to platen 36 as illustrated and described above with reference to FIG. 2. Controller 58 receives input signals from and sends output command signals to optical imaging head assembly 34 and/or motor 56 to control operation of optical imaging head assembly 34 and/or motor 56.

Controller 58 includes a data processor 60. Data processor 60 receives and processes inputs from optical imaging head assembly 34 and motor 56 of optical scanner 30 and provides output commands to optical imaging head assembly 34 and/or motor 56. In one embodiment, processing performed by data processor 60 is performed through the use of hard-wired electronic components or through the use of a computer and associated computer programs provided in software or firmware, or may be processed by using combinations of both data processing techniques. Data processor 60 receives, for example, an input signal from optical imaging head assembly 34 indicating the displacement of optical imaging head assembly 34, as previously illustrated by double arrow 46 in FIG. 2. As medium 45 is scanned, data signals from sensor array 50 are received and processed by controller 58, which subsequently stores data on a suitable medium or generates a display signal, allowing the halftone image on medium 45 to be reproduced on a display device.

In one embodiment, optical scanner 130 includes medium transport assembly 59. Medium transport assembly 59 represents, for example, an automatic document feeder that advances medium 45 relative to optical imaging head assembly 134, as illustrated and described above with reference to FIG. 3. As such, data processor 60 facilitates communication between motor 56 and medium transport assembly 59. In one embodiment, when medium 45 is placed in medium transport assembly 59, an input signal is received by data processor 60 indicating the presence of medium 45. Data processor 60 then sends an output signal to motor 56 to feed medium 45 through medium transport assembly 59 so that medium 45 is advanced relative to optical imaging head assembly 134 for scanning.

Figure 7:
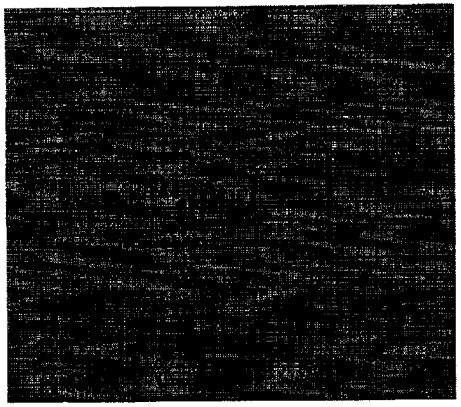
FIG. 7 is a master halftone image.
Figure 7:
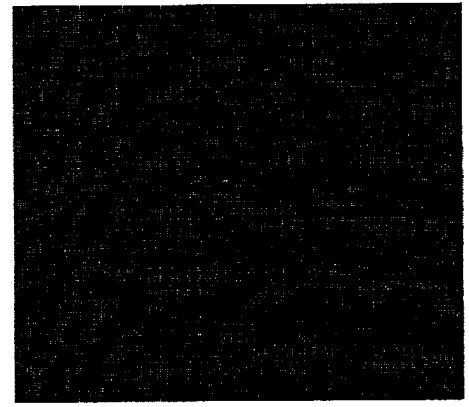
Figure 7:
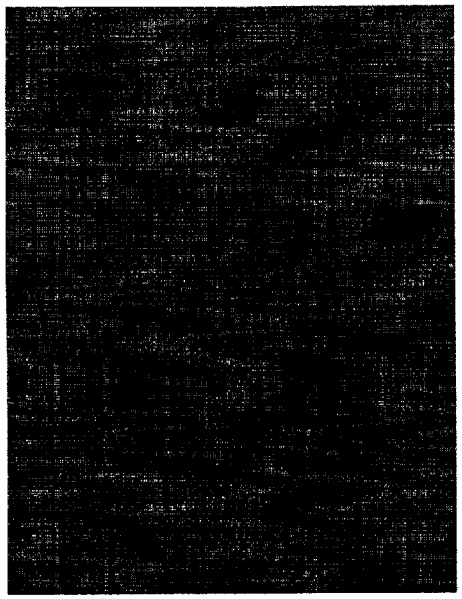
Figure 7:
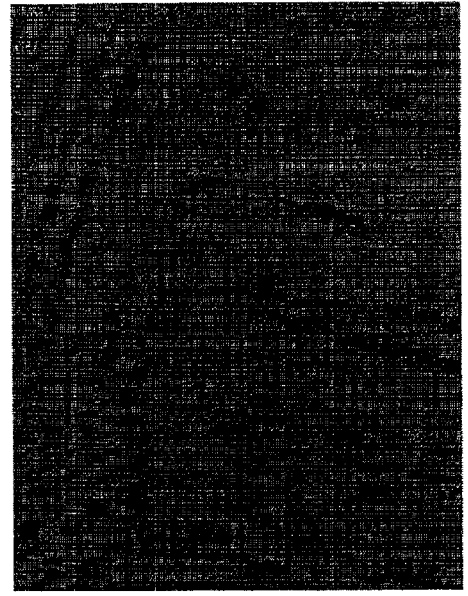

FIG. 7 is a master halftone image produced by a halftoning process. Halftoning, as is well known in the art, uses patterns of individual dots to create various colors or grays with a device, such as a printer or a display. For example, with halftoning, colors other than cyan, yellow, magenta, black, red, green, and/or blue, including varying shades or levels of such colors, can be created with a device. As such, the halftone image includes a plurality of image dots with an intensity or darkness intensity of the image dots being varied to produce an image. The halftone image has a halftone resolution and at least one halftone angle. More specifically, the image dots of the halftone image are arranged in rows that are evenly spaced from one another and oriented at an angle. As such, spacing of the rows establishes the halftone resolution of the halftone image on medium 45. The halftone resolution is typically represented in resolutions of 100× dots-per-inch (dpi) such as 200 dpi, 400 dpi, 600 dpi, etc.

Typically, conventional optical scanners employ optical imaging head assemblies with physical resolutions of 100× dots-per-inch (dpi) such as 200 dpi, 300 dpi, 600 dpi, etc. As such, the physical resolution of the optical imaging head assembly has a mathematical relationship to the resolution of the halftone image. When the physical resolution of the optical imaging head assembly is mathematically related to the resolution of the halftone image by a simple mathematical formula (e.g., 100×), the conventional optical scanner picks up alternating light parts and dark parts of the halftone image resulting in bands and blotches across a scanned halftone image.

Figure 1:
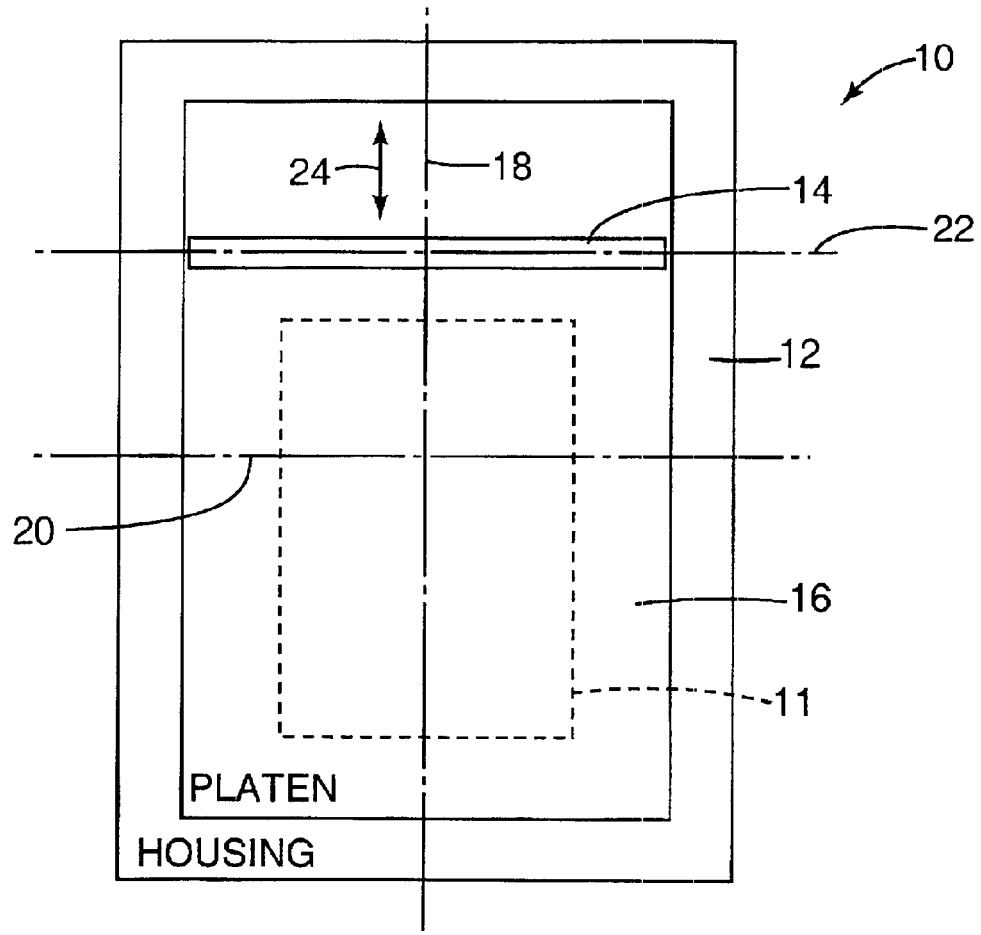
FIG. 1 is a schematic illustration of a portion of a prior art optical scanner.
Figure 8:
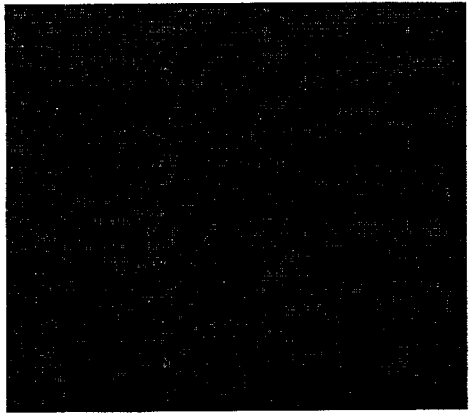
FIG. 8 is a scanned halftone image scanned by a prior art optical scanner.
Figure 8:
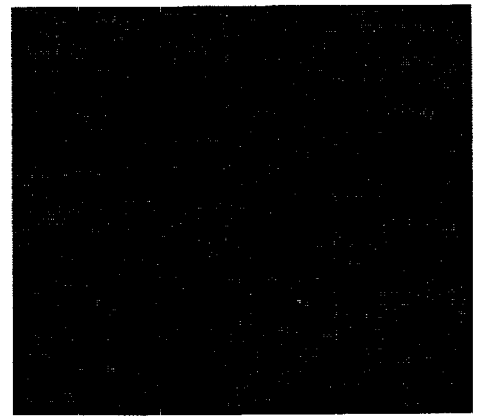
Figure 8:
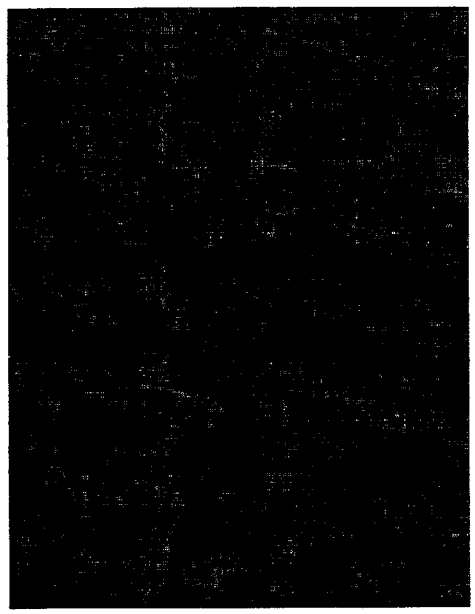
Figure 8:
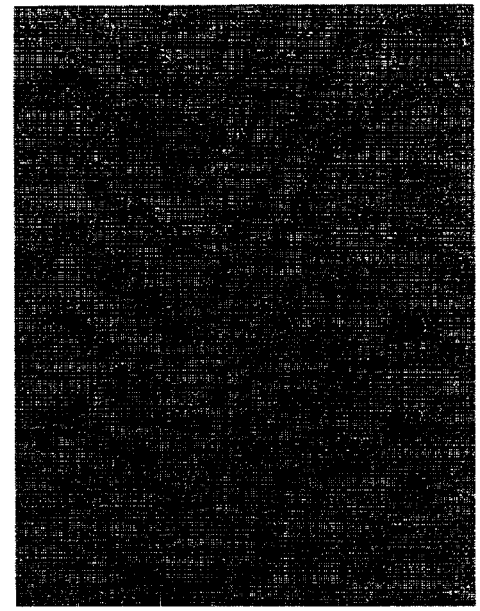

FIG. 8 illustrates reproduction of the master halftone image of FIG. 7 by scanning of the master halftone image with conventional optical scanner 10 (FIG. 1). Unfortunately, the halftone resolution of the master halftone image of FIG. 7 is mathematically related to the physical resolution or scanning frequency of optical imaging head 14 used in conventional optical scanner 10. When the halftone resolution of the halftone image is mathematically related to the physical resolution of an optical imaging head assembly used with the conventional scanning system by a simple mathematical formula such as 100×, image pixels and halftone dots may interfere, thereby creating moiré patterns, which are identifiable by dark lines or patches in areas of uniform shading. Such print defects, commonly referred to as image artifacts, produce a patterned or mottled appearance and, as such, degrade image quality.

As described above, optical imaging head assembly 34 of optical scanner 30 is oriented at angle 44 with respect to first housing axis 38. When optical imaging head assembly 34 is oriented at angle 44 with respect to first housing axis 38, optical imaging head assembly 34 has an effective resolution that is relatively prime to the resolution of the halftone image, such that the effective resolution is not mathematically related to the resolution of the halftone image. More specifically, the effective resolution of optical imaging head assembly 34 is relatively prime to the halftone resolution of the halftone image. Meaning, there is no integer greater than 1 that is both a divisor of the effective resolution of optical imaging head assembly 34 and a divisor of the halftone resolution of the halftone image. For example, if the physical resolution of optical imaging head assembly 34 is 300 dpi and angle 44 is approximately 30 degrees, the effective resolution of optical imaging head assembly 34 is approximately 347 dpi. Therefore, if the halftone resolution is 200 dpi, the effective resolution of optical imaging head assembly 34 is relatively prime to the halftone resolution of the halftone image, and the physical resolution of optical imaging head assembly 34 is no longer an issue since the simple mathematical relationship between the physical resolution of the optical imaging head assembly and the resolution of the halftone image is eliminated. Thus, image artifacts or defects resulting when the image pixels and halftone dots interfere are minimized or reduced.

Figure 9:
FIG. 9 is a scanned halftone image scanned by an optical scanner according to the present invention.
Figure 9:
Figure 9:
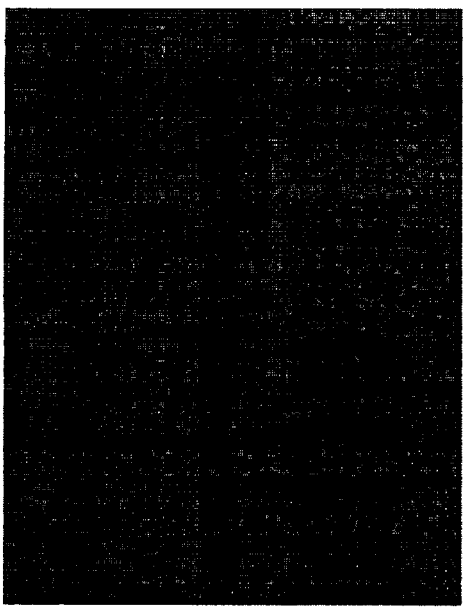
Figure 9:
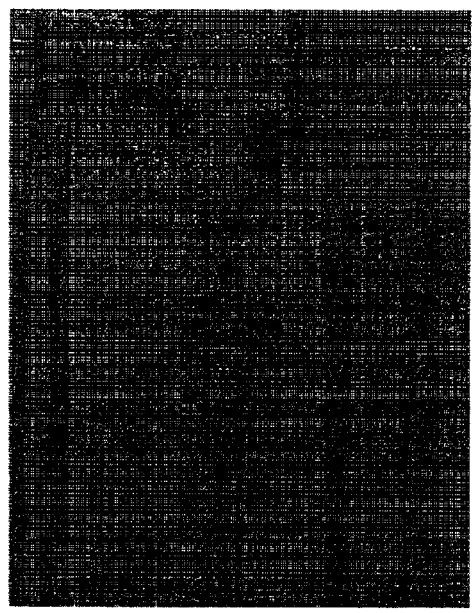

FIG. 9 illustrates reproduction of the master halftone image of FIG. 7 by scanning the master halftone image with optical scanner 30 (including optical scanner 130 and optical scanner 230) with optical imaging head assembly 34 (including optical imaging head assembly 134 and optical imaging head assembly 234) oriented at angle 44. As illustrated in FIG. 9, reproduction of the master halftone image using optical scanner 30 does not include print defects that are easily identifiable in FIG. 8. Thus, reproduction of the halftone image is enhanced with optical scanner 30 (including optical scanner 130 and optical scanner 230) configured according to the present invention.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system for scanning a medium having an axis, the system comprising:
    a housing; and
    an optical imaging head assembly mounted in the housing and having an assembly axis, wherein the assembly axis of the optical imaging head assembly is oriented at an acute angle with respect to the axis of the medium, and wherein the optical imaging head assembly includes a sensor array extended between opposite sides of the medium.

2. The system of claim 1, wherein the axis of the medium includes a longitudinal medium axis and a transverse medium axis oriented substantially perpendicular to the longitudinal medium axis, wherein the assembly axis of the optical imaging head assembly is oriented at the acute angle with respect to the transverse medium axis.

3. The system of claim 2, wherein the housing has a first housing axis and a second housing axis oriented substantially perpendicular to the first housing axis, wherein the longitudinal medium axis is oriented substantially parallel to the first housing axis, and wherein the transverse medium axis is oriented substantially parallel to the second housing axis.

4. The system of claim 3, wherein the optical imaging head assembly is moveable along the first housing axis relative to the medium to scan the medium.

5. The system of claim 4, wherein the optical imaging head assembly is moveable at the acute angle along the first housing axis to scan the medium.

6. The system of claim 3, wherein the medium is moveable along the first housing axis relative to the optical imaging head assembly to scan the medium.

7. The system of claim 6, wherein the medium is moveable with the longitudinal medium axis oriented substantially parallel with the first housing axis.

8. The system of claim 2, wherein the optical imaging head assembly is moveable along the longitudinal medium axis relative to the medium to scan the medium.

9. The system of claim 8, wherein the optical imaging head assembly is moveable at the acute angle along the longitudinal medium axis to scan the medium.

10. The system of claim 1, wherein the acute angle is in a range of 20 degrees to 40 degrees.

11. The system of claim 1, wherein the acute angle is approximately 30 degrees.

12. The system of claim 1, further comprising:
    a platen mounted on the housing and positioned above the optical imaging head assembly, wherein the optical imaging head assembly is moveable relative to the platen to scan the medium.

13. The system of claim 1, wherein the optical imaging head assembly includes a light source illuminating the medium and a sensor array receiving reflected light from the medium.

14. A system for scanning a medium having an axis and including a halftone image having a halftone resolution, the system comprising:
    a housing; and
    an optical imaging head assembly mounted in the housing and having an assembly axis, wherein the assembly axis of the optical imaging head assembly is oriented at an acute angle with respect to the axis of the medium, wherein the optical imaging head assembly has an effective resolution when oriented at the acute angle with respect to the axis of the medium, wherein the effective resolution of the optical imaging head assembly is relatively prime to the halftone resolution of the halftone image.

15. A method of scanning a medium, the method comprising:
    scanning the medium along a line oriented at an acute angle with respect to an axis of the medium, including scanning the medium with an optical imaging head assembly having an assembly axis oriented at the acute angle with respect to the axis of the medium, wherein the optical imaging head assembly includes a sensor array extended between opposite sides of the medium.

16. The method of claim 15, wherein the acute angle is in a range of 20 degrees to 40 degrees.

17. The method of claim 15, wherein the acute angle is approximately 30 degrees.

18. The method of claim 15, wherein scanning the medium with the optical imaging head assembly includes moving and maintaining the optical imaging head assembly at the acute angle with respect to the axis of the medium.

19. The method of claim 15, wherein scanning the medium with the optical imaging head assembly includes moving the optical imaging head assembly relative to the medium.

20. The method of claim 15, wherein scanning the medium with the optical imaging head assembly includes moving the medium relative to the optical imaging head assembly.

21. A method of scanning a medium having an axis, the method comprising:

configuring an optical imaging head assembly to be oriented at an acute angle with respect to the axis of the medium, including extending a sensor array of the optical imaging head assembly between opposite sides of the medium; and scanning the medium with the optical imaging head assembly.

22. The method of claim 21, wherein the axis of the medium includes a longitudinal medium axis and a transverse medium axis, wherein the optical imaging head assembly has an assembly axis, and wherein configuring the optical imaging head assembly to be oriented at the acute angle includes orienting the assembly axis of the optical imaging head assembly at the acute angle with respect to the transverse medium axis.

23. The method of claim 22, wherein configuring the optical imaging head assembly to be oriented at the acute angle includes orienting the optical image head assembly in a range of 20 degrees to 40 degrees with respect to the transverse medium axis.

24. The method of claim 22, wherein configuring the optical imaging head assembly to be oriented at the acute angle includes orienting the optical imaging head assembly at approximately 30 degrees with respect to the transverse medium axis.

25. The method of claim 22, wherein scanning the medium with the optical imaging head assembly includes moving the optical imaging head assembly along the longitudinal medium axis relative to the medium.

26. The method of claim 25, wherein moving the optical imaging head assembly along the longitudinal medium axis includes maintaining the acute angle of the optical imaging head assembly.

27. The method of claim 22, wherein configuring the optical imaging head assembly to be oriented at the acute angle includes positioning the optical imaging head assembly in a housing including a first housing axis and a second housing axis oriented substantially perpendicular to the first housing axis, wherein the longitudinal median axis is oriented substantially parallel to the first housing axis and the transverse medium axis is oriented substantially parallel the second housing axis.

28. The method of claim 27, wherein scanning the medium with the optical imaging head assembly includes moving the optical imaging head assembly along the first housing axis relative to the medium.

29. The method of claim 28, wherein moving the optical imaging head assembly along the first housing axis includes maintaining the acute angle of the optical imaging head assembly.

30. The method of claim 27, wherein scanning the medium with the optical imaging head assembly includes moving the medium along the first housing axis relative to the optical imaging head assembly.

31. The method of claim 30, wherein moving the medium along the first housing axis includes maintaining the acute angle of the optical imaging head assembly.

32. A method of scanning a medium including a halftone image having a halftone resolution, the method comprising:

scanning the medium along a line oriented at an acute angle with respect to an axis of the medium, including scanning the medium with an optical imaging head assembly having an assembly axis oriented at the acute angle with respect to the axis of the medium, wherein the optical imaging head assembly has an effective resolution when oriented at the acute angle with respect to the axis of the medium, wherein the effective resolution of the optical imaging head assembly is relatively prime to the halftone resolution of the halftone image.

33. A method of scanning a medium having an axis and including a halftone image having a halftone resolution, the method comprising:

configuring an optical imaging head assembly to be oriented at an acute angle with respect to the axis of the medium; and scanning the medium with the optical imaging head assembly, wherein the optical imaging head assembly has an effective resolution when oriented at the acute angle with respect to the axis of the medium, wherein the effective resolution of the optical imaging head assembly is relatively prime to the halftone resolution of the halftone image.

* * * * *